UNITED STATES PATENT OFFICE.

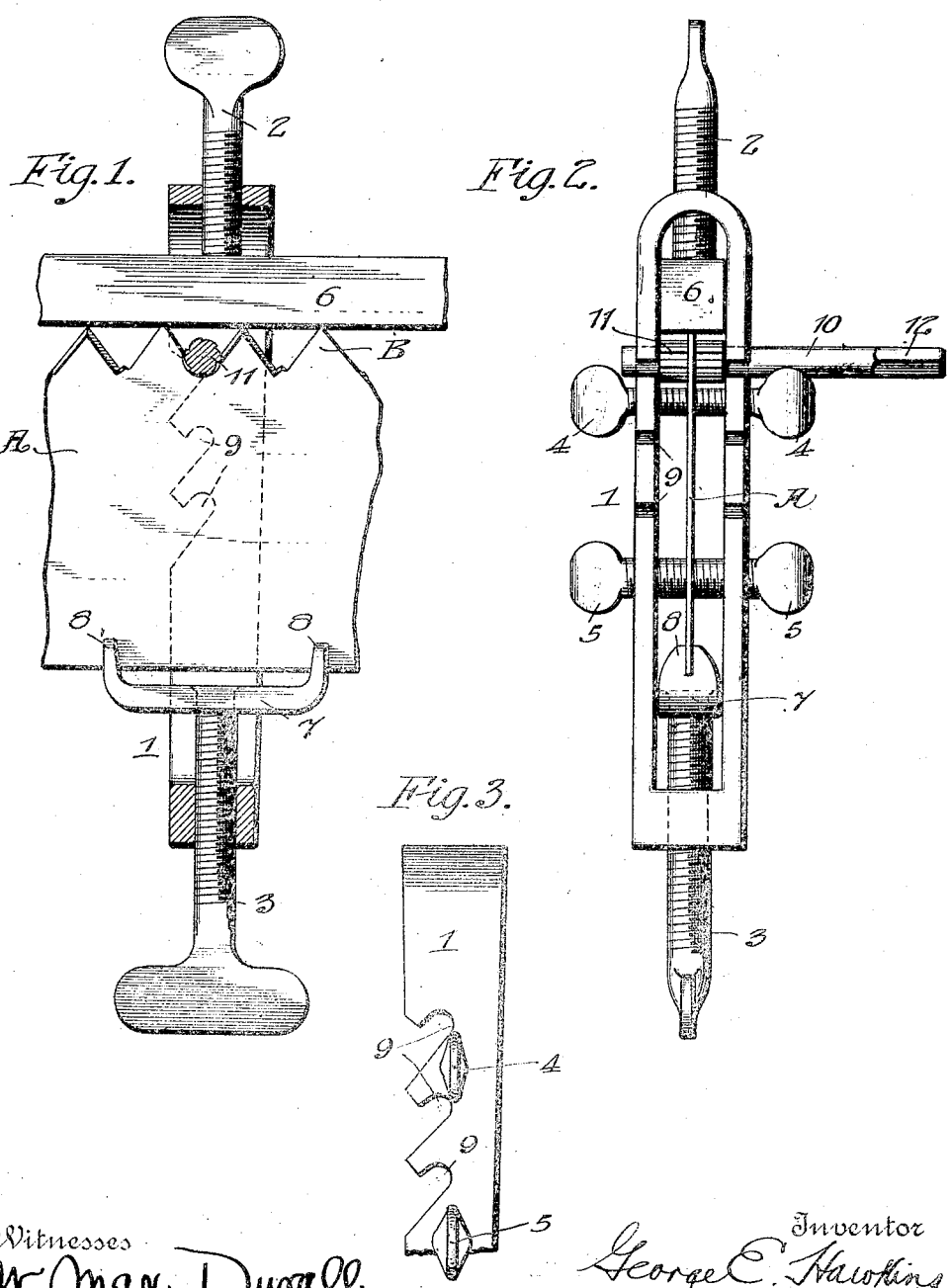

GEORGE E. HAWKINS, OF WELLBORN, FLORIDA, ASSIGNOR OF ONE-HALF TO T. J. HACKNEY, OF WELLBORN, FLORIDA.

SAW-GUMMER.

No. 879,962.

Specification of Letters Patent.

Patented Feb. 25, 1908.

Application filed August 5, 1907. Serial No. 387,132.

*To all whom it may concern:*

Be it known that I, GEORGE E. HAWKINS, a citizen of the United States, residing at Wellborn, in the county of Suwanee and State of Florida, have invented certain new and useful Improvements in Saw-Gummers, of which the following is a specification.

My invention relates to saw gummers of that class employing transverse milling cutters to accomplish the gumming operation, and particularly contemplates the provision of a simple and inexpensive structure which may be readily and quickly adjusted to different sized saw blades.

My invention further and specifically resides in the following features of construction, arrangement and operation as will be hereinafter described with reference to the accompanying drawing forming a part of this specification, in which like numerals are used to designate like parts throughout the several figures, and in which—

Figure 1 is a vertical sectional view taken through my improved structure showing the saw blade adjustably held therein and in elevation, Fig. 2 is an end elevation of my improved device in operative engagement about a saw blade, and Fig. 3 is a side elevation of the upper portion of my improved structure, the lower portion having been broken away, and the upper adjusting screw having been removed.

In the practical embodiment of my invention, I provide a narrow elongated rectangular frame 1 having upper and lower adjusting thumb screws 2 and 3 respectively, threadedly engaging through opposite ends of said frame. The frame 1 is adapted, as is clearly shown in Figs. 1 and 2, to receive a saw blade A therethrough, and said frame 1 is further provided with alined pairs of upper and lower transverse adjusting thumb screws 4 and 5 respectively. The thumb screws 4 and 5 abut each side of the saw blade A for a ready alinement of the same within the frame 1. The adjusting thumb screw 2 is provided with a block 6 preferably of a soft wood to prevent damage to the saw teeth B against which the same is adjusted as shown. The adjusting thumb screw 3 is provided with a U-shaped frame 7 having its legs 8 similarly slotted adapted to receive the saw blade therein, it being seen that the thumb screw 2 may be loosened and the thumb screw 3 screwed up tightly, to obtain the vertical adjustment of the saw blade A. The frame 1 is further provided with a plurality of diagonally upwardly extending slots 9 cut in both the side members thereof and alined therebetween for the reception within a selected one of said slots, of an arbor 10 having a milling cutter 11 formed thereon and extending transversely between the side members of said frame. The arbor 10 is thus loosely held within the selected one of slots 9, and the saw blade must be adjusted vertically and tightly thereagainst as described, to a position shown in Fig. 1 in which said arbor and its milling cutter will be prevented from displacement. The arbor 10 is provided with a squared outer end 12 adapted to receive a suitable handle to rotate said arbor, having a squared opening or bore therein.

Having fully described my invention, I claim:

The combination in a saw gummer, of a frame comprising separated parallel side members adapted to receive a saw blade between them, and each of said side members provided with a plurality of diagonal slots, the slots of one member alining with the slots of the other, and a transverse rotatable arbor adapted for insertion within a selected pair of said slots, and having a milling cutter formed thereon between said side members of said frame, and adjustable means for adjusting said saw blade within said frame toward said cutter, substantially as described.

In testimony whereof I affix my signature in presence of two witnesses.

GEORGE E. HAWKINS.

Witnesses:
W. R. MOORE,
A. S. STANSEL.